(12) United States Patent
Zhu et al.

(10) Patent No.: US 11,159,917 B2
(45) Date of Patent: Oct. 26, 2021

(54) MBMS ARCHITECTURE WITH CDN CACHING IN ENB

(71) Applicant: QUALCOMM Incorporated, San Diego, CA (US)

(72) Inventors: Xipeng Zhu, San Diego, CA (US); Gavin Bernard Horn, San Diego, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/743,966

(22) PCT Filed: Aug. 27, 2015

(86) PCT No.: PCT/CN2015/088234
§ 371 (c)(1),
(2) Date: Jan. 11, 2018

(87) PCT Pub. No.: WO2017/031743
PCT Pub. Date: Mar. 2, 2017

(65) Prior Publication Data
US 2018/0206079 A1    Jul. 19, 2018

(51) Int. Cl.
*H04W 4/06* (2009.01)
*H04L 29/08* (2006.01)
(Continued)

(52) U.S. Cl.
CPC ............ *H04W 4/06* (2013.01); *H04L 12/189* (2013.01); *H04L 51/38* (2013.01);
(Continued)

(58) Field of Classification Search
CPC ... H04W 4/06; H04W 72/005; H04W 68/005; H04W 72/12; H04W 88/08; H04L 51/38; H04L 12/189; H04L 67/2842
See application file for complete search history.

(56) References Cited

U.S. PATENT DOCUMENTS 9,590,814 B2    3/2017  Pazos et al.
2004/0117860 A1  6/2004  Yi et al.
(Continued)

FOREIGN PATENT DOCUMENTS

CN      1863344 A     11/2006
CN    101237384 A      8/2008
(Continued)

OTHER PUBLICATIONS

Supplementary European Search Report—EP15902014—Search Authority—Munich—dated Jan. 17, 2019.
(Continued)

*Primary Examiner* — Christopher P Grey
(74) *Attorney, Agent, or Firm* — Loza & Loza LLP

(57) ABSTRACT

In an aspect, a method for a network access node for broadcasting content includes receiving a message from a broadcast coordination entity, the message including information associated with content to be broadcasted to one or more user equipments (UEs), caching the content locally at the network access node, and sending the cached content to the one or more UEs.

16 Claims, 14 Drawing Sheets

(51) Int. Cl.
    *H04L 12/18*     (2006.01)
    *H04W 68/00*     (2009.01)
    *H04W 72/00*     (2009.01)
    *H04W 72/12*     (2009.01)
    *H04L 12/58*     (2006.01)
    *H04W 88/08*     (2009.01)

(52) U.S. Cl.
    CPC ....... *H04L 67/2842* (2013.01); *H04W 68/005* (2013.01); *H04W 72/005* (2013.01); *H04W 72/12* (2013.01); *H04W 88/08* (2013.01)

(56) References Cited

U.S. PATENT DOCUMENTS

| | | | |
|---|---|---|---|
| 2005/0111395 A1 | 5/2005 | Hwang et al. | |
| 2010/0272004 A1* | 10/2010 | Maeda | H04L 5/0007 370/312 |
| 2011/0116433 A1* | 5/2011 | Dorenbosch | H04W 72/005 370/312 |
| 2011/0211515 A1* | 9/2011 | Zeller | H04W 72/005 370/312 |
| 2011/0244788 A1 | 10/2011 | Ode et al. | |
| 2012/0269110 A1* | 10/2012 | Walker | H04W 28/16 370/312 |
| 2013/0007814 A1* | 1/2013 | Cherian | H04L 65/80 725/62 |
| 2014/0198712 A1* | 7/2014 | Howard | H04W 4/06 370/312 |
| 2015/0063188 A1* | 3/2015 | Kanesalingam | H04W 72/005 370/312 |
| 2015/0208209 A1* | 7/2015 | Jamadagni | H04W 4/06 370/312 |
| 2016/0007320 A1* | 1/2016 | Wang | H04L 12/189 370/235 |
| 2016/0087810 A1* | 3/2016 | Zhang | H04W 4/10 370/312 |
| 2016/0119762 A1* | 4/2016 | Zhu | H04W 76/27 370/312 |
| 2016/0135016 A1* | 5/2016 | Zou | H04W 4/06 370/312 |
| 2016/0316351 A1* | 10/2016 | Kodaypak | H04W 68/005 |
| 2016/0323719 A1* | 11/2016 | Wang | H04W 76/25 |
| 2017/0251453 A1* | 8/2017 | Huang | H04W 72/005 |

FOREIGN PATENT DOCUMENTS

| | | |
|---|---|---|
| CN | 102026372 A | 4/2011 |
| CN | 103534970 A | 1/2014 |
| CN | 103733722 A | 4/2014 |
| EP | 2728912 A1 | 5/2014 |
| JP | 2007503158 A | 2/2007 |
| JP | 2007532074 A | 11/2007 |
| JP | 2008061263 A | 3/2008 |
| JP | 2014522192 A | 8/2014 |
| JP | 2014529237 A | 10/2014 |
| JP | 2015509690 A | 3/2015 |
| WO | 2005101886 A2 | 10/2005 |
| WO | 2007091042 A1 | 8/2007 |
| WO | 2010073403 A1 | 7/2010 |
| WO | 2013019903 | 2/2013 |
| WO | 2013027022 A1 | 2/2013 |
| WO | 2013138020 A1 | 9/2013 |

OTHER PUBLICATIONS

International Search Report and Written Opinion—PCT/CN2015/088234—ISA/EPO—dated Jun. 1, 2016.

* cited by examiner

| | MBSFN | SC-PTM | Unicast |
|---|---|---|---|
| Route | BM-SC→MBMS-GW→eNB | BM-SC→MBMS-GW→eNB | PGW/SGW→eNB |
| Outer Channel Coding | BM-SC: Raptor Code | BM-SC: Raptor Code | NA |
| Inner Channel Coding | eNB: Turbo Code | eNB: Turbo Code | eNB: Turbo Code |
| Retransmission | BM-SC: ADP based unicast fix | eNB: HARQ ? BM-SC: ADP based unicast fix | eNB: HARQ eNB: RLC AM UE/Server: TCP |
| Scheduling | eNB: MSI based on SYNC | eNB: PDCCH | eNB: PDCCH |
| Link Adaption | No | CQI and HARQ feedback | CQI and HARQ feedback |
| Encryption | BM-SC | BM-SC | eNB |

| | PMCH | MCCH | MTCH |
|---|---|---|---|
| Outer Channel Coding | eNB: Raptor Code | eNB: Raptor Code | eNB: Raptor Code |
| Inner Channel Coding | eNB: Turbo Code | eNB: Turbo Code | eNB: Turbo Code |
| Retransmission | eNB: Raptor based RLC? | eNB: HARQ eNB: Raptor based RLC | eNB: HARQ eNB: Raptor based RLC |
| Scheduling | eNB: MSI based on SYNC? | eNB: PDCCH | eNB: PDCCH |
| Link Adaption | FFS | CQI and HARQ feedback | CQI and HARQ feedback |
| Encryption | eNB: key from BM-SC | eNB: key from BM-SC | eNB: key from BM-SC? |

| MBMS function | 4G | 5G | Remarks if different |
|---|---|---|---|
| Signaling Routing | BM-SC → MBMS-GW → MME → MCE → eNB | BM-SC → MCE → eNB | MME and MBMS-GW are used for signaling routing only in 4G almost without any processing. The additional hops should be removed in 5G. |
| User Plane Routing | BM-SC → MBMS-GW → eNB → UE | eNB→UE (cache hit)<br>PGW/MBMS-GW → eNB → UE (cache miss) | Cache non real time content in eNB to improve the QoE and save backhaul cost |
| Synchronization | SYNC protocol between BM-SC and eNB | For non-real time service, MCE schedules the transmission with time/sync info | The MCE can schedule the transmission of each eNB in the MBSFN area in synchronized way. |
| Broadcast Unicast Service continuity | UE based | eNB controlled and/or UE based | When MBMS service is stopped in 4G, UE requests unicast delivery by accessing a URL. In addition this UE based service continuity solution, eNB may establish unicast bearer for UE before MBMS bearer is stopped. |
| Session Location Filtering | BM-SC<br>MME | BM-SC<br>BM-SC | In session start/stop/update, MME determines the target MCEs per the MBMS Service Area, i.e. sends session start/stop/update to the MCEs of the target MBMS Service Area only.<br>In 5G, the filtering should be done by BM-SC logically. |

*FIG. 12*

MBMS ARCHITECTURE WITH CDN CACHING IN ENB

CROSS-REFERENCE TO RELATED APPLICATION(S)

This application claims priority to and the benefit of PCT patent application number PCT/CN2015/088234 filed on Aug. 27, 2015, the entire content of which is incorporated herein by reference.

BACKGROUND

Field of the Disclosure

Aspects of the disclosure relate generally to efficient content delivery, and more specifically, but not exclusively, to a multimedia broadcast multicast service (MBMS) architecture with content delivery network (CDN) caching in eNB.

Description of Related Art

The demand for content (e.g., movies, music, etc.) by users of mobile devices is continuously increasing. Such content may be broadcast to multiple mobile devices (also referred to as user equipments (UEs)) over a mobile communication network. However, as the number of UEs in mobile communication networks continues to grow, techniques for efficiently broadcasting the content to UEs in a mobile communication network are needed.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In an aspect, a method for a network access node for broadcasting content includes receiving a message from a broadcast coordination entity, the message including information associated with content to be broadcasted to one or more UEs, caching the content locally at the network access node, and sending the cached content to the one or more UEs.

In an aspect, a method for a network access node includes receiving, from a broadcast coordination entity, system information to be sent to one or more UEs, and sending the system information through a broadcast control channel.

In an aspect, a method for a network access node includes receiving, from a broadcast coordination entity, system information to be sent to one or more UEs, and sending the system information through a broadcast control channel.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

FIG. 2 is a diagram showing content delivery in an LTE mobile network and potential enhancements in a 5G mobile network.

FIG. 8 is a bearer comparison table.

FIG. 12 is a diagram comparing features of 4G and 5G mobile communication networks.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
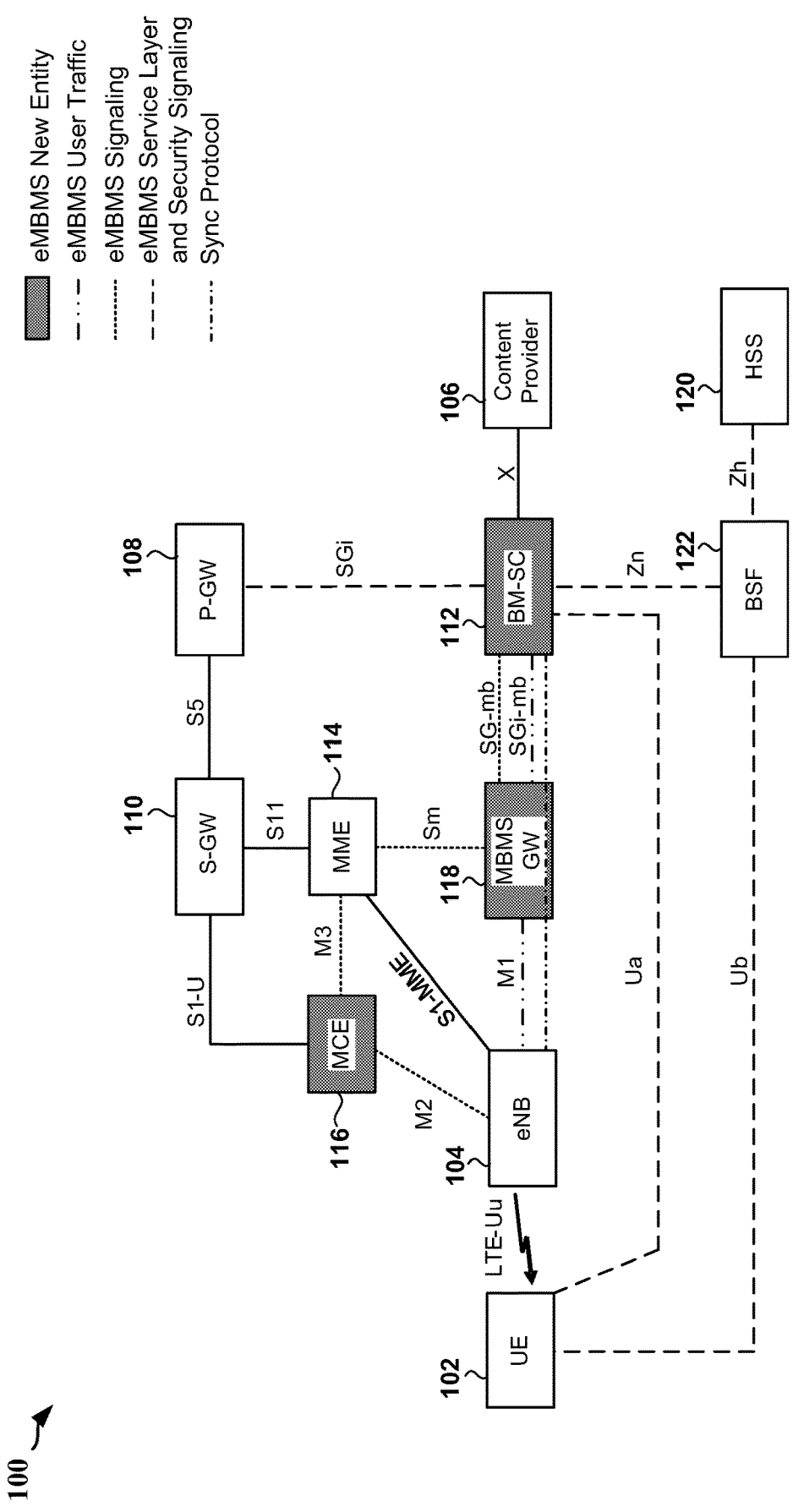
FIG. 1 is a block diagram of an example architecture that provides broadcast services in a mobile communication network.

FIG. 1 is a block diagram of an example architecture 100 that provides broadcast services in a mobile communication network. For example, the broadcast services may include a multimedia broadcast multicast service (MBMS) or an evolved MBMS (eMBMS), and the mobile communication network may be a Long Term Evolution (LTE) network. As shown in FIG. 1, architecture 100 includes a user equipment (UE) 102, a network access node 104 (e.g., a base station, network access point, or evolved Node B (eNB)), content provider 106, packet data network (PDN) gateway (P-GW) 108, a serving gateway (S-GW) 110, a broadcast multicast service center (BM-SC) 112, a mobility management entity (MME) 114, multi-cell/multicast coordination entity (MCE) 116, eMBMS gateway (MBMS-GW) 118, home subscriber server (HSS) 120, and bootstrapping server function (BSF) 122.

In an aspect, BM-SC 112 may provide membership, session and transmission, proxy and transport, service announcement, security, and/or content synchronization functions. In an aspect, MBMS-GW 118 (e.g., eMBMS-GW) distributes MBMS user plane data to network access node(s) 104 using an Internet Protocol (IP) multicast and performs MBMS session control signaling towards the E-UTRAN via the MME 114. The MCE 116 may be a separate entity or may be a part of the network access node 104. The MCE 116 may provide admission control and allocation radio resources. For example, the MCE 116 may provide allocation of the time and/or frequency radio resource for eMBMS. Moreover, the MCE 116 may determine the radio configuration, such as the modulation and coding scheme (MCS), to be used in a transmission.

Implementation of MBMS in mobile network architectures subsequent to LTE, such as a 5G mobile network, may require support of existing eMBMS services. For example, existing eMBMS services may include non-real time eMBMS services (e.g., streaming, downloading) and real-time eMBMS services (e.g., group communication, mission critical push to talk (MCPTT)). Moreover, the 5G mobile network may require support of new services, such as transmission of paging messages and system information using a broadcast control channel. Integration with a content delivery network (CDN) (e.g., OTT CDN) may be required to achieve backhaul transmission saving, quality of experience (QoE) improvement, flexible switching between unicast and broadcast/multicast, and/or cross-layer optimization. The 5G mobile network may support reception of an eMBMS service with a content only contract (e.g., a content based subscription) or without a contract. The 5G mobile network may be configured to provide higher performance by providing, for example, shorter delay periods and higher spectral efficiency.

FIG. 2 is a diagram 200 showing content delivery in an LTE mobile network and potential enhancements in a 5G mobile network. It should be noted that LTE was designed for efficient IP packet delivery. Therefore, a radio access network (RAN) and content network in LTE may not be aware of the specific content delivery protocol (e.g. DASH/hypertext transfer protocol (HTTP)) being used. Multicast-broadcast single-frequency network (MBSFN), single-cell point-to-multipoint (SC-PTM), and unicast utilize different processing techniques, which make service continuity in bearer type switching supported by the service layer. In a 5G mobile network, more efficient approaches for video object delivery may be implemented. Such approaches may include implementing a unified DASH/HTTP/video-aware protocol stack for MBSFN, SC-PTM and unicast, moving the bearer type switching to the RAN level, and/or providing native support for mobile CDN.

In an example Internet CDN architecture, a CDN may direct UE access to the cache node close to the UE's edge gateway (e.g. P-GW, BM-SC) by domain name system (DNS) or HTTP redirection. In an example mobile CDN architecture, content may be cached close to the edge of RAN (e.g. network access node, base station, or eNB) of the UE. As such, backhaul transmission may be avoided or reduced. In an aspect, the content may be cached above the edge gateway. In such aspect, selected IP traffic offload (SIPTO) may enable deployment of the P-GW close to the network access node (e.g., eNB). Caching close to the SIPTO P-GW achieves caching close to the network access node (e.g., eNB). In such aspect, there may be a minor change or no change to the 3GPP standard. In another aspect, the mobile CDN may cache content below the edge gateway. In such aspect, content may be cached inside the network access node (e.g., eNB) logically. This aspect facilitates cross-layer optimization and involves changes to the 3GPP standard as discussed below.

Figure 3:
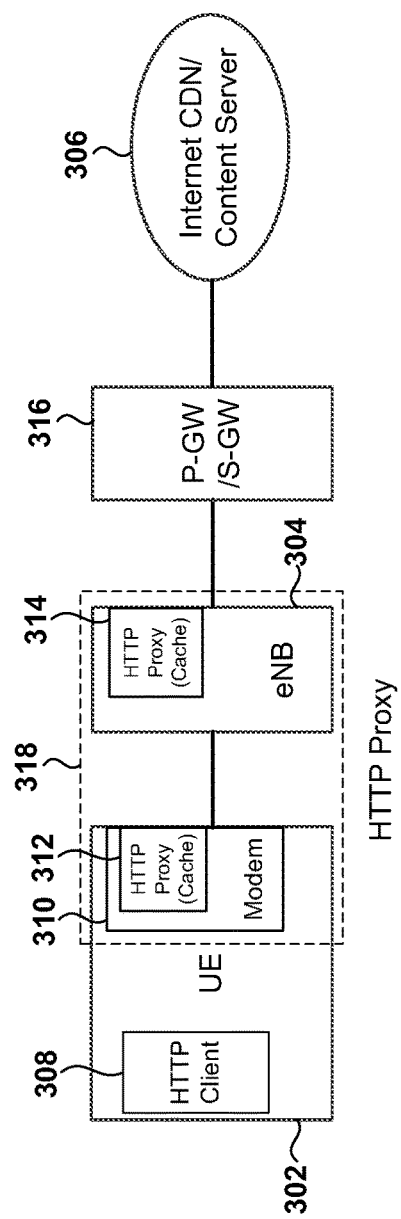
FIG. 3 is a diagram illustrating an example mobile CDN architecture.

FIG. 3 is a diagram illustrating an example mobile CDN architecture 300. As shown in FIG. 3, mobile CDN architecture 300 includes a UE 302, a network access node (e.g., eNB) 304, a P-GW/S-GW 316, and an Internet CDN/Content Server 306. The UE 302 includes an HTTP client 308 and a modem 310. As further shown in FIG. 3, an HTTP proxy 318 may be implemented between the UE 302 and the network access node 304 by integrating an HTTP proxy module 312 in the modem 310 of the UE 302 and by integrating an HTTP proxy module 314 in the network access node 304. The HTTP proxy 318 enables HTTP-aware caching of content. In an aspect, a service provider list with eligible (e.g., paid to a mobile network operator (MNO)) service providers may be configured in the UE 302 by an MNO to accelerate operation of the mobile CDN, which may provide a new business model for the MNO. In an aspect, the UE 302 and the network access node 304 may cache content, thereby leveraging the HTTP native proxy mechanism. For example, content requested by the UE 302 may be logically cached in the network access node 304. If the content is physically cached at the network access node 304 (e.g., locally cached at the network access node 304), the network access node 304 may deliver the content directly to the UE 302. Otherwise, the network access node 304 may fetch the content for the UE 302 from the Internet CDN/content server 306 via the P-GW/S-GW 316. The mobile CDN architecture 300 may provide an optimized air interface. The air interface may be viewed as an HTTP proxy internal interface and a new protocol stack may be used in the air interface.

Figure 4:
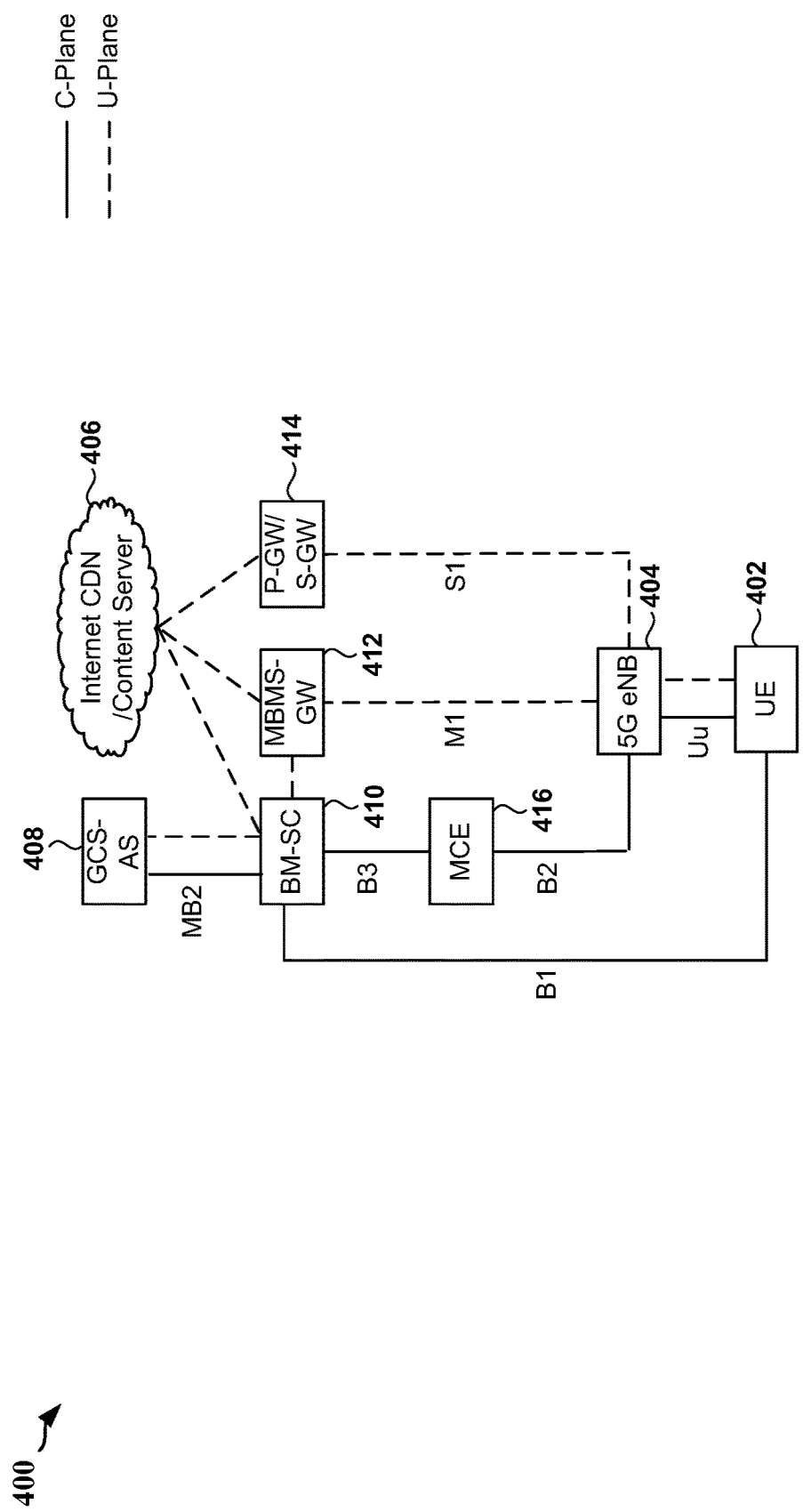
FIG. 4 is a diagram of an architecture that provides broadcast services in a mobile communication network in accordance with various aspects of the disclosure.

FIG. 4 is a diagram of an architecture 400 that provides broadcast services in a mobile communication network in accordance with various aspects of the disclosure. For example, the mobile communication network may be a 5G mobile network and the broadcast services may be eMBMS. As shown in FIG. 4, the architecture 400 includes a UE 402, a network access node 404, an Internet CDN/content server 406, a group communication system application server (GCS-AS) 408, a BM-SC 410, an MBMS-GW 412, a P-GW/S-GW 414, and a broadcast coordination entity 416. For example, the broadcast coordination entity 416 may be an MCE. It should be noted that in architecture 400, the MBMS-GW 412 and the MME (not shown in FIG. 4) are removed from the control plane logically. The MCE 416 manages the MBSFN area and determines an optimal bearer type, such as MBSFN, SC-PTM, and unicast. Architecture 400 may provide real time services and non-real time services for the UE 402. For example, real time services may include group communication system enablers (GCSE), Mission Critical Push to Talk (MCPTT), and/or live streaming. In an aspect, the user plane may be the same as LTE MBMS: GCS-AS/Content server→BM-SC→MBMS- GW→eNB→UE. The control plane may be substantially similar to LTE MBMS except that MME and MBMS-GW are removed.

For example, non-real time services may include downloading and/or streaming Content may be cached in the network access node logically. If the content to broadcast is not physically cached, the network access node manages to fetch the content from the Internet CDN/content server 406. In an aspect, an S1 protocol may be used to fetch cache missed content by unicast, and an M1 protocol may be used for pre-cache by IP multicast. The MCE 416 may be configured to schedule data transmissions.

The control plane of the architecture 400 will now be discussed. In an aspect, the BM-SC 410 is a service layer entity of MBMS. In a 5G mobile network, the BM-SC 410 provides control plane functions, such as membership, security, and/or service announcement (e.g., generates a user service description (USD) and sends it to the UE in any way). User plane function is integrated into the network access node 404. The MME and MBMS-GW are removed from the signaling route logically. As such, the UE 402 may receive MBMS without a unicast contract with an MNO. It should be noted that the MME and MBMS-GW may not have additional value in processing MBMS signaling. The MCE 416 may serve as the controller of an MBSFN area. For example, the MCE 416 may schedule the data transmissions and determine the bearer type between MBMS and SC-PTM/unicast.

Figure 5:
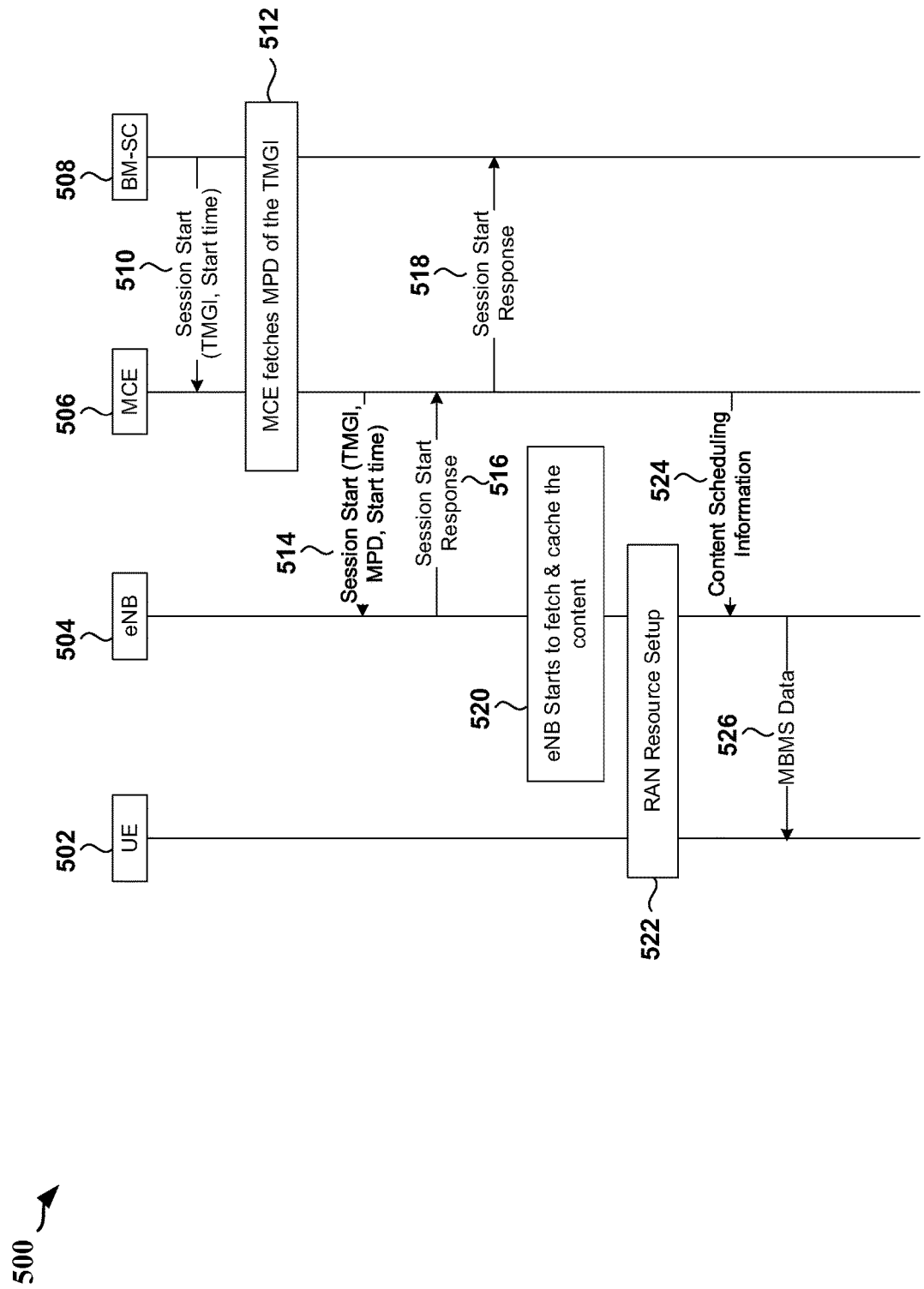
FIG. 5 is a diagram illustrating a session start procedure for a broadcast/multicast.

FIG. 5 is a diagram 500 illustrating a session start procedure for a broadcast/multicast. The session start procedure may be used for MBMS bearer establishment. FIG. 5 includes UE 502, network access node 504, MCE 506, and BM-SC 508. At 510, the BM-SC 508 sends a session start message. In an aspect, the session start message may include a temporary mobile group identifier (TMGI) and a start time. At 512, the MCE 506 fetches the media presentation description (MPD) of the TMGI. For example, the MPD may be a dynamic adaptive streaming over HTTP (DASH) MPD. At 514, the MCE 506 sends a session start message to the network access node 504. In an aspect, the session start message from the MCE 506 may include a TMGI, MPD, and/or a start time. In an aspect, the network access node 504 may pre-cache the content when the session start message is received. At 516, the network access node 504 sends session start response to the MCE 506. At 518, the MCE 506 sends the session start response to the BM-SC 508. At 520, the network access node 504 starts to fetch and cache content. At 522, the network access node 504 sets up RAN resources for the UE 502. At 524, the MCE 506 sends content scheduling information to the network access node 504. For example, the MCE 506 may determine the optimal bearer type and may include the optimal bearer type in the content scheduling information (CSI). At 526, the network access node 504 sends the content (e.g., MBMS data) to the UE 502. In an aspect, the broadcast/multicast share the same procedure in the core network.

Figure 6:
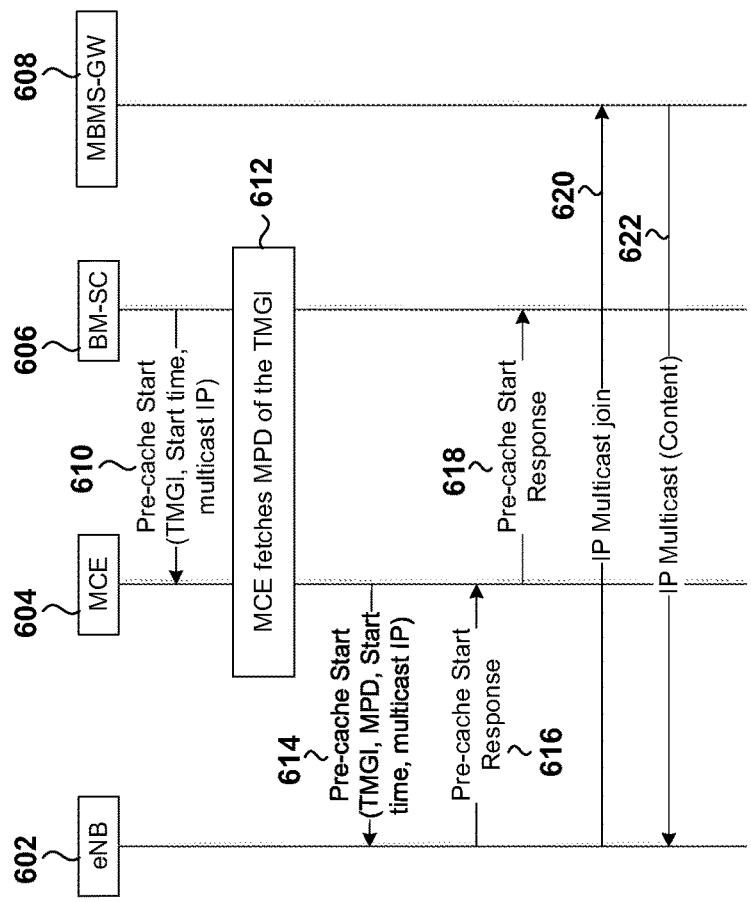
FIG. 6 is a diagram illustrating a content pre-cache procedure.

FIG. 6 is a diagram 600 illustrating a content pre-cache procedure. In an aspect, the content pre-cache procedure may be initiated by the BM-SC 606 for a TMGI. FIG. 6 includes a network access node 602 (e.g., eNB), MCE 604, BM-SC 606, and MBMS-GW 608. At 610, the BM-SC 606 sends a pre-cache start message to the MCE 604. In an aspect, the pre-cache start message may include a TMGI, a start time, and/or a multicast IP. For example, the start time may be the time to multicast on M1. At 612, the MCE 604 fetches the MPD of the TMGI. At 614, the MCE 604 sends a pre-cache start message to the network access node 602. In an aspect, the pre-cache start message from the MCE 604 may include a TMGI, MPD, a start time, and/or a multicast IP address. At 616, the network access node 602 sends a pre-cache start response to the MCE 604. At 618, the MCE 604 sends the pre-cache start response message to the BM-SC 606. If the network access node 602 determines to pre-cache the content, then at 620, the network access node 602 sends an IP multicast join message to the MBMS-GW 608. For example, the network access node 602 may determine per its cache capacity and playout time in USD. At 622, the MBMS-GW 608 sends the content using an IP multicast, which is received by the network access node 602.

Figure 7:
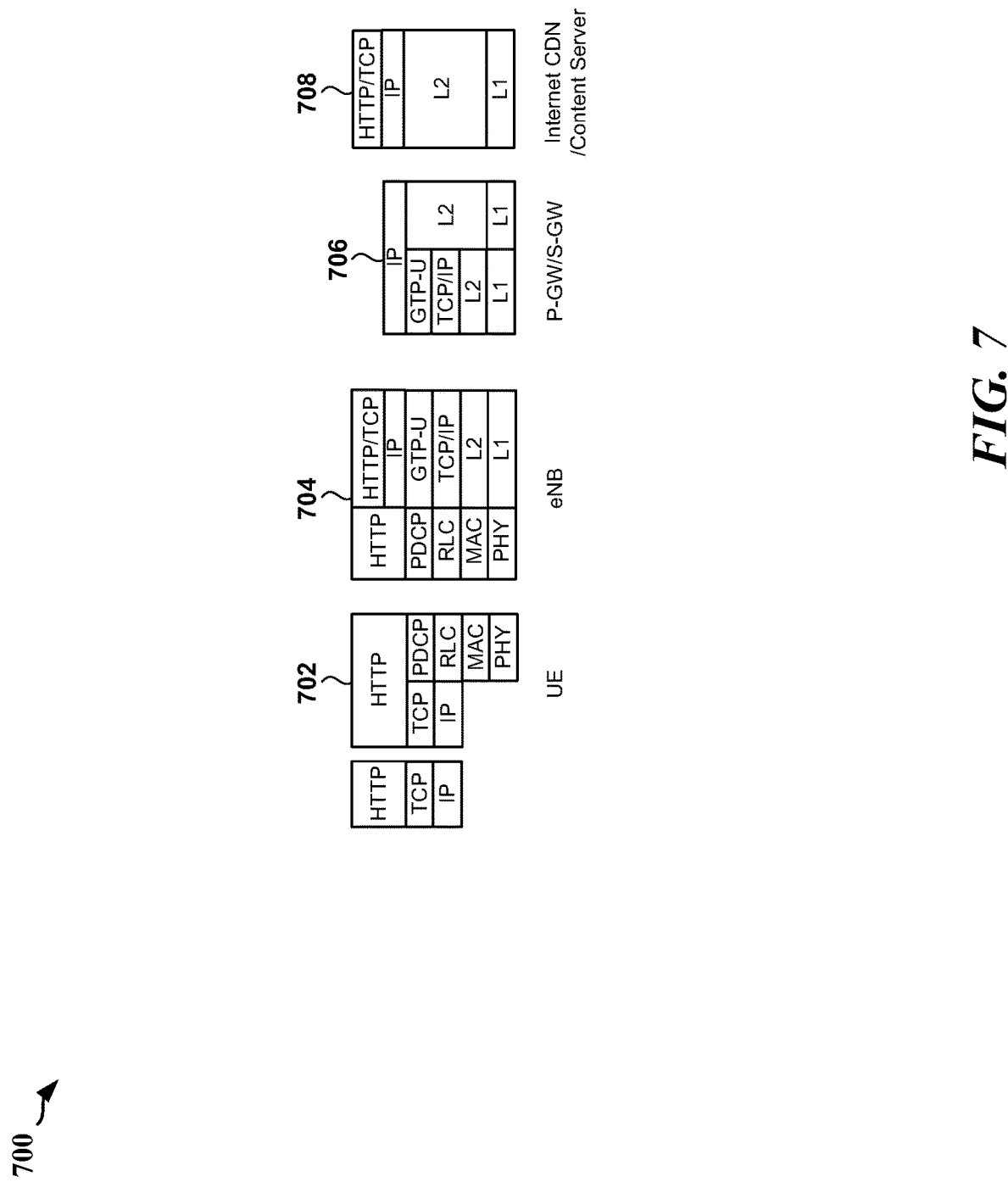
FIG. 7 is a diagram illustrating an example unified user plane protocol stack in accordance with various aspects of the disclosure.

FIG. 7 is a diagram illustrating an example unified user plane protocol stack 700 in accordance with various aspects of the disclosure. Unified user plane protocol stack 700 includes a UE protocol stack 702, a network access node protocol stack 704, a P-GW/S-GW protocol stack 706, and an Internet CDN/Content Server protocol stack 708. The unified user plane protocol stack 700 is common for broadcasts, multicasts, and unicasts. However, the function and procedure may be different in different bearer types as indicated in the bearer comparison table 800 in FIG. 8.

In an aspect, the network access node and the modem of the UE in FIG. 7 may serve as a DASH/HTTP proxy. The DASH protocol is defined in the 3GPP standard (e.g., 3GPP TS26.247) for progressive downloads with rate adaption to channel status. The DASH protocol is based on HTTP, which supports cache natively. In an aspect, MBMS service platform/middleware may be based on DASH. The DASH/HTTP proxy may ensure continuity of service. The DASH/HTTP proxy may make an application/operating system (OS) unaware as to a bearer type (e.g., MBMS, multicast, unicast) being implemented. In MBMS, DASH client requests semi-static segment size per USD and MPD. A DASH request is not transmitted through an air interface.

In an aspect, the DASH Server/Proxy internal interface may be an air interface. In an aspect, a DASH segment may be carried over PDCP directly and, therefore, a transmission control protocol (TCP)/IP may not be needed. A transaction ID may be used to associate the DASH request and response, instead of a TCP connection. For unicast, a special bearer without IP may be configured by the network access node for content delivery.

Figure 9:
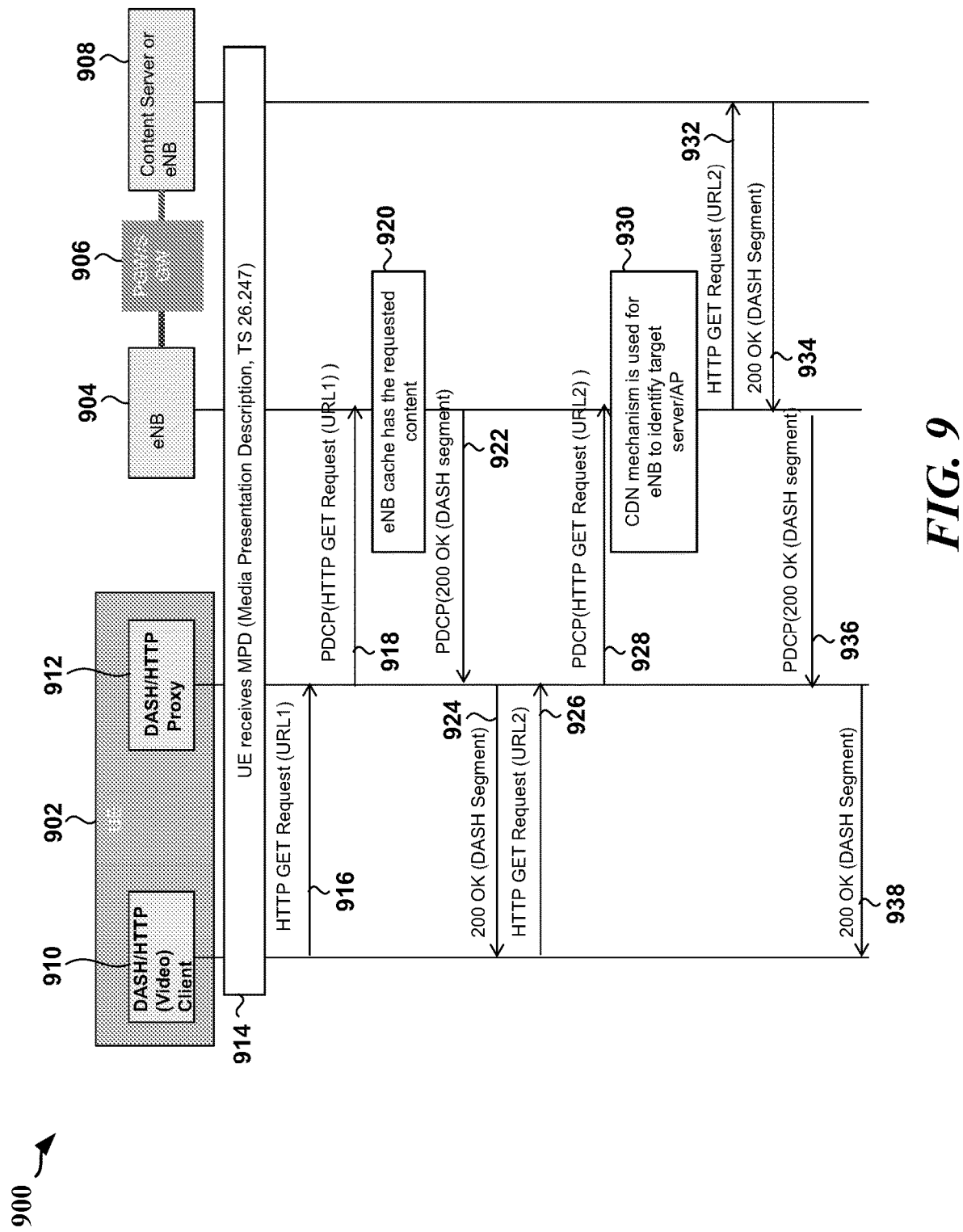
FIG. 9 is a diagram illustrating a unicast DASH streaming call flow in accordance with various aspects of the disclosure.

FIG. 9 is a diagram 900 illustrating a unicast DASH streaming call flow in accordance with various aspects of the disclosure. As shown in FIG. 9, diagram 900 includes UE 902, network access node 904, P-GW/S-GW 906, and content server (or eNB) 908. As further shown in FIG. 9, the UE 902 includes a DASH/HTTP (Video) client 910 and a DASH/HTTP proxy 912. At 914, the UE 902 receives an MPD. At 916, an HTTP GET request message associated with a first URL (e.g., URL1) is transferred from the DASH/HTTP client 910 to the DASH/HTTP proxy 912. At 918, the UE 902 includes the HTTP GET request message in a Packet Data Convergence Protocol (PDCP) message and sends the PDCP message to the network access node 904. At 920, the network access node 904 determines that the requested content is stored in the cache of the network access node 904. At 922, the network access node 904 sends a PDCP message to the UE 902 that includes a DASH segment associated with the requested content. At 924, the DASH/HTTP proxy 912 transfers the DASH segment to the DASH/HTTP client 910.

At 926, an HTTP GET request message associated with a second URL (e.g., URL2) is transferred from the DASH/HTTP client 910 to the DASH/HTTP proxy 912. At 928, the UE 902 includes the HTTP GET request message in a PDCP message and sends the PDCP message to the network access node 904. At 930, the network access node 904 uses a CDN mechanism to determine a target server (or access point) from which to retrieve the requested content. At 932, the network access node 904 sends a HTTP GET request message associated with the second URL to the content server 908. At 934, the network access node 904 receives a DASH segment associated with the requested content. At 936, the network access node 904 sends a PDCP message to the UE 902 that includes the DASH segment associated with the requested content. At 938, the DASH/HTTP proxy 912 transfers the DASH segment to the DASH/HTTP client 910.

Figure 10:
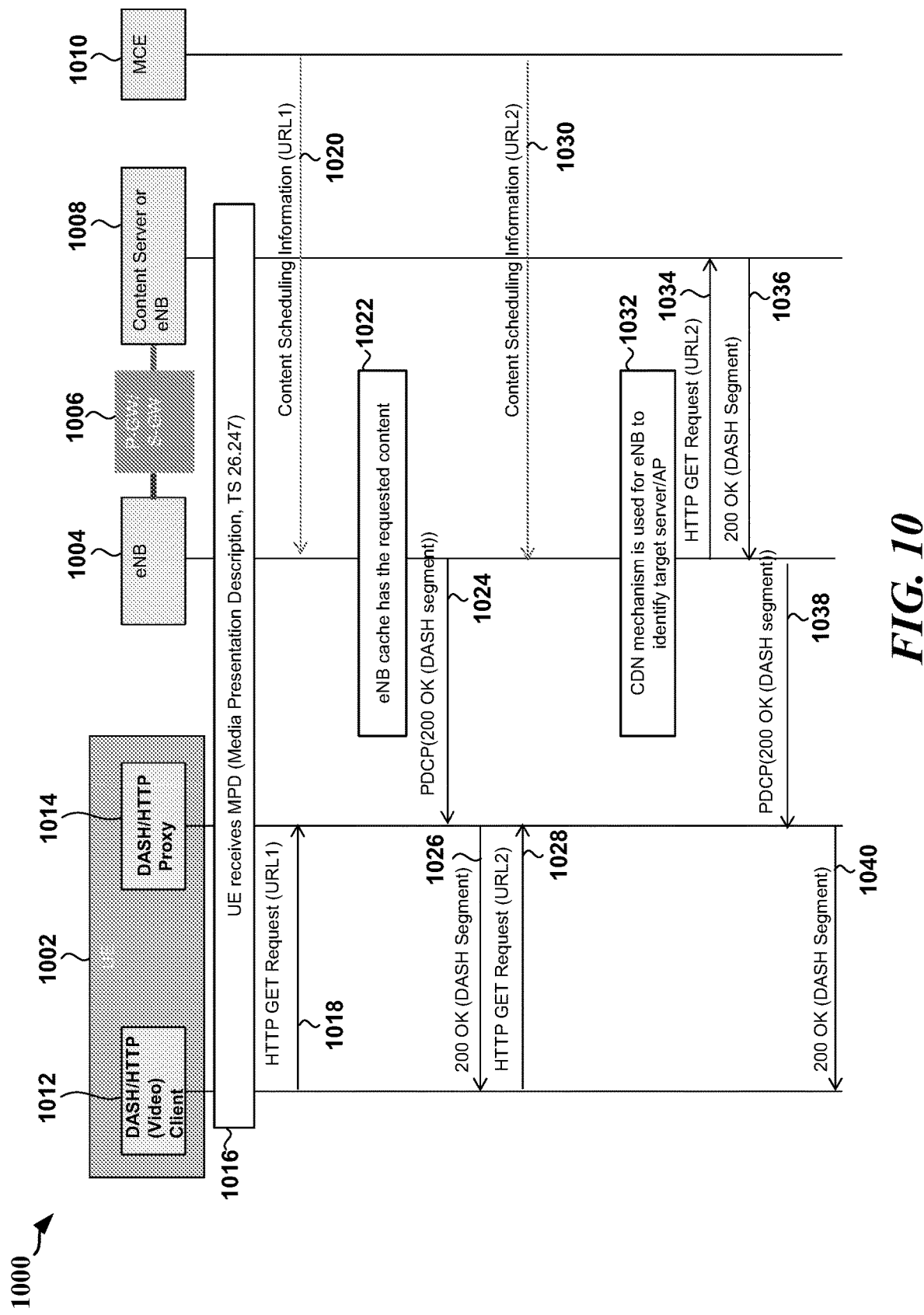
FIG. 10 is a diagram illustrating a broadcast DASH streaming call flow in accordance with various aspects of the disclosure.

FIG. 10 is a diagram 1000 illustrating a broadcast DASH streaming call flow in accordance with various aspects of the disclosure. In an aspect, the broadcast DASH streaming call flow may be an MBMS DASH streaming call flow. As shown in FIG. 10, diagram 1000 includes UE 1002, network access node 1004, P-GW/S-GW 1006, content server (or eNB) 1008, and MCE 1010. As further shown in FIG. 10, the UE 1002 includes a DASH/HTTP (Video) client 1012 and a DASH/HTTP proxy 1014. At 1016, the UE 1002 receives an MPD. At 1018, an HTTP GET request message associated with a first URL (e.g., URL1) is transferred to the DASH/HTTP proxy 1014. At 1020, the MCE 1010 sends content scheduling information to the network access node 1004. The content scheduling information includes scheduling information associated with the first URL. At 1022, the network access node 1004 determines that the requested content is stored in the cache of the network access node 1004. At 1024, the network access node 1004 sends a PDCP message to the UE 1002 that includes a DASH segment associated with the requested content. At 1026, the DASH/HTTP proxy 1014 transfers the DASH segment to the DASH/HTTP client 1012.

At 1028, an HTTP GET request message associated with a second URL (e.g., URL2) is transferred from the DASH/HTTP client 1012 to the DASH/HTTP proxy 1014. At 1030, the MCE 1010 sends content scheduling information for the second URL (e.g., URL2) to the network access node 1004. At 1032, the network access node 1004 uses a CDN mechanism to determine a target server (or access point) from which to retrieve the requested content. At 1034, the network access node 1004 sends a HTTP GET request message associated with the second URL to the content server 1008. At 1036, the network access node 1004 receives a DASH segment associated with the requested content. At 1038, the network access node 1004 sends a PDCP message to the UE 1002 that includes the DASH segment associated with the requested content. At 1040, the DASH/HTTP proxy 1014 transfers the DASH segment to the DASH/HTTP client 1012.

Figure 11:
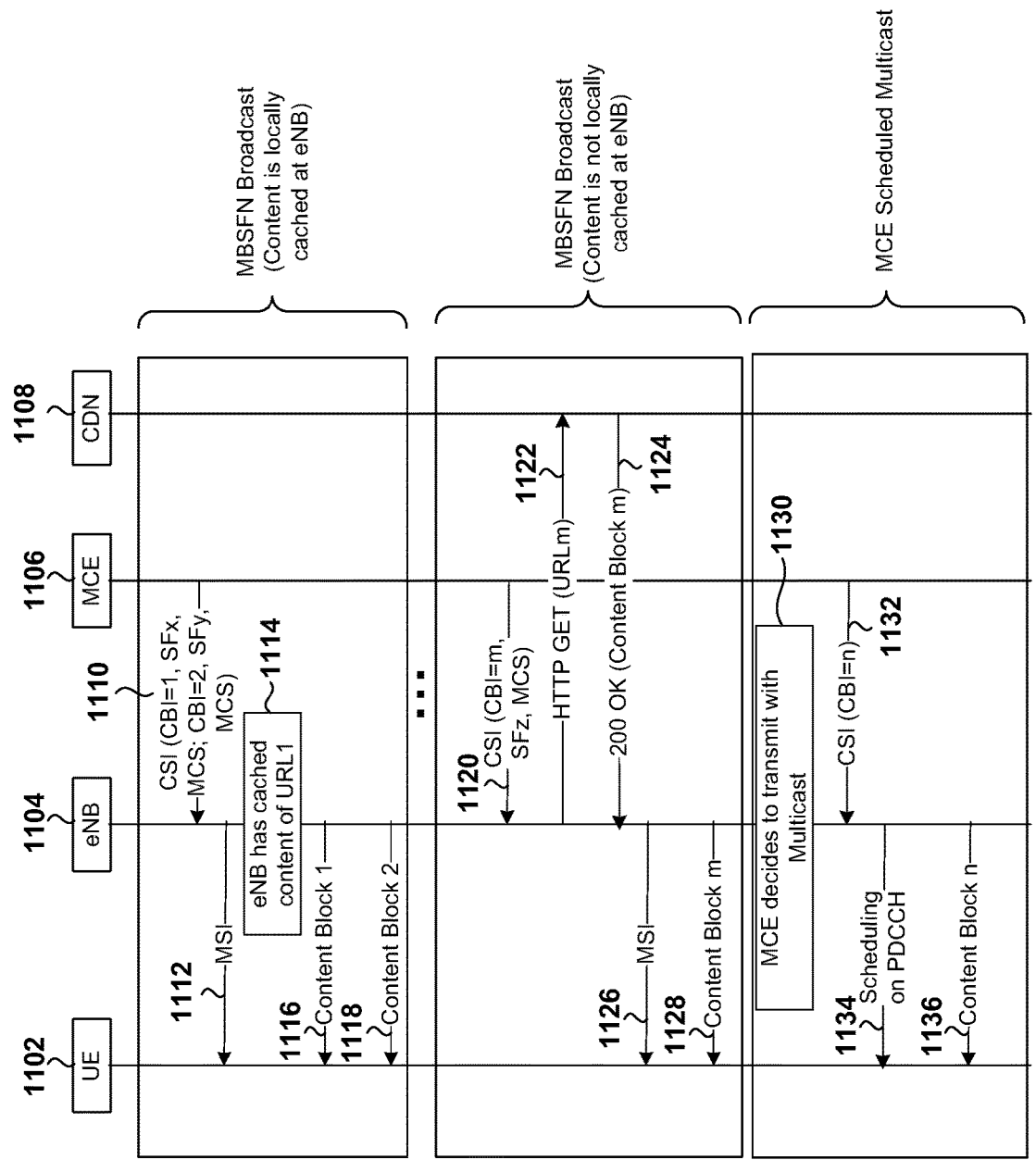
FIG. 11 is a diagram illustrating an example MCE scheduled broadcast/multicast in accordance with various aspects of the disclosure.

FIG. 11 is a diagram 1100 illustrating an example MCE scheduled broadcast/multicast in accordance with various aspects of the disclosure. As shown in FIG. 11, diagram 1100 includes a UE 1102, network access node 1104, an MCE 1106, and a CDN 1108. At 1110, the MCE 1106 schedules one or more transmissions and sends content scheduling information (CSI) to the network access node 1104. In an aspect, the CSI may include a content block identifier (CBI), time information, and a modulation and coding scheme (MCS). For example, the time information may be a sub-frame identifier (SFx, SFy). In such example, the subframe identifier may identify a particular subframe (e.g., subframe number x or subframe number y, where x and y represent different integer values) in a radio frame. At 1112, the network access node 1104 sends multicast channel (MCH) scheduling information (MSI) to the UE 1102. At 1114, the network access node 1104 determines that the requested content (e.g., content associated with a first URL (URL1)) is stored in the cache of the network access node 1104. At 1116, the network access node 1104 sends a first content block (e.g., Content Block 1) to the UE 1102. At 1118, the network access node 1104 sends a second content block (e.g., Content Block 2) to the UE 1102. It should be understood that the network access node 1104 may continue to send additional content blocks to the UE 1102. In an aspect, all the network access nodes in the MBSFN area transmit the same CBI at the same time (e.g., SFx) in the same MCS.

At 1120, the MCE 1106 schedules one or more transmissions and sends CSI to the network access node 1104. In an aspect, the CSI may include a CBI, time information, and an MCS. For example, the time information may be a subframe identifier (e.g., SFz). In such example, the subframe identifier may identify a particular subframe (e.g., subframe number z, where z represents an integer value) in a radio frame. At 1122, the network access node 1104 determines that the requested content is not stored in the cache of the network access node 1104 and sends a message (e.g., an HTTP GET message) requesting the content (e.g., content associated with URLm) to the CDN 1108. At 1124, the CDN 1108 sends a response message to the network access node 1104. For example, the response message may include a content block m associated with the URLm. At 1126, the network access node 1104 sends an MSI to the UE 1102. At 1128, the network access node 1104 sends a content block (e.g., Content Block m) to the UE 1102.

At 1130, the network access node 1104 determines that the MCE has decided to transmit using a multicast. At 1132, the MCE 1106 sends a CSI to the network access node 1104. For example, the CSI may include a CBI. It should be noted that with respect to the multicast transmission, the CSI does not include a subframe identifier and/or an MCS. In an aspect, the network access node 1104 may determine how to deliver the content block to the UE(s), such as UE 1102. At 1134, the network access node 1104 sends a message including scheduling on the physical downlink control channel (PDCCH). At 1136, a content block n is sent to the UE 1102. If a content block associated with the requested content is not cached in the network access node 1104, the network access node 1104 may fetch the content block from the CDN 1108. In an aspect, CBI-URL mapping is derived from the MPD.

FIG. 12 is a diagram 1200 comparing 4G and 5G mobile communication networks.

Figure 13:
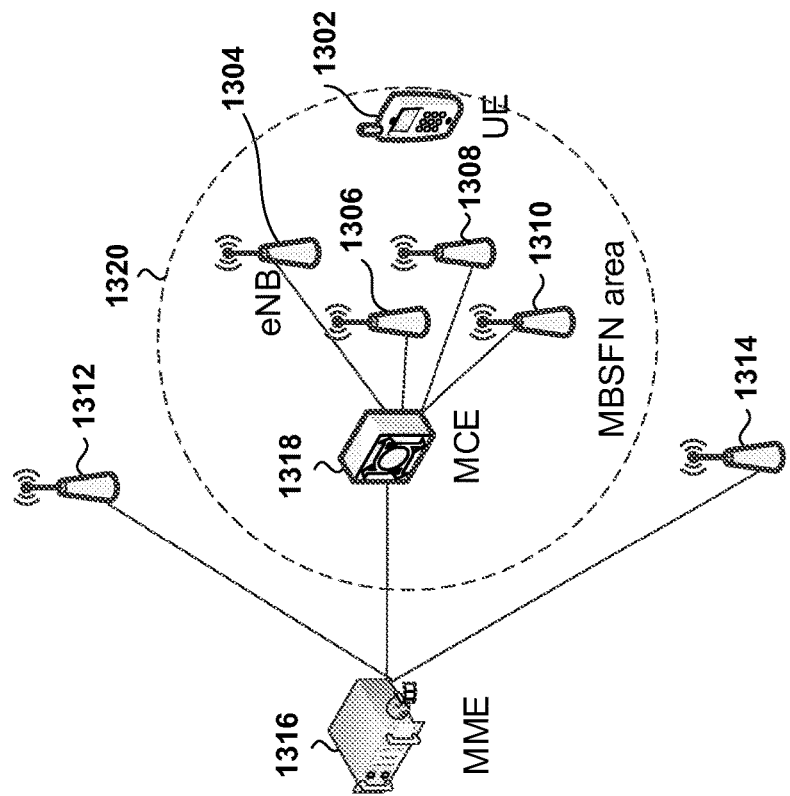
FIG. 13 is a diagram illustrating an example network.

FIG. 13 is a diagram illustrating an example network 1300. As shown in FIG. 13, network 1300 includes a UE 1302, network access nodes 1304, 1306, 1308, 1310, 1312, and 1314, MME 1316, and MCE 1318. In network 1300, UE 1302 and network access nodes 1304, 1306, 1308, and 1310 are within the MBSFN area 1320. As described below, and with reference to the signal flow diagram of FIG. 14, the network 1300 may page the UE 1302 over MBMS.

Figure 14:
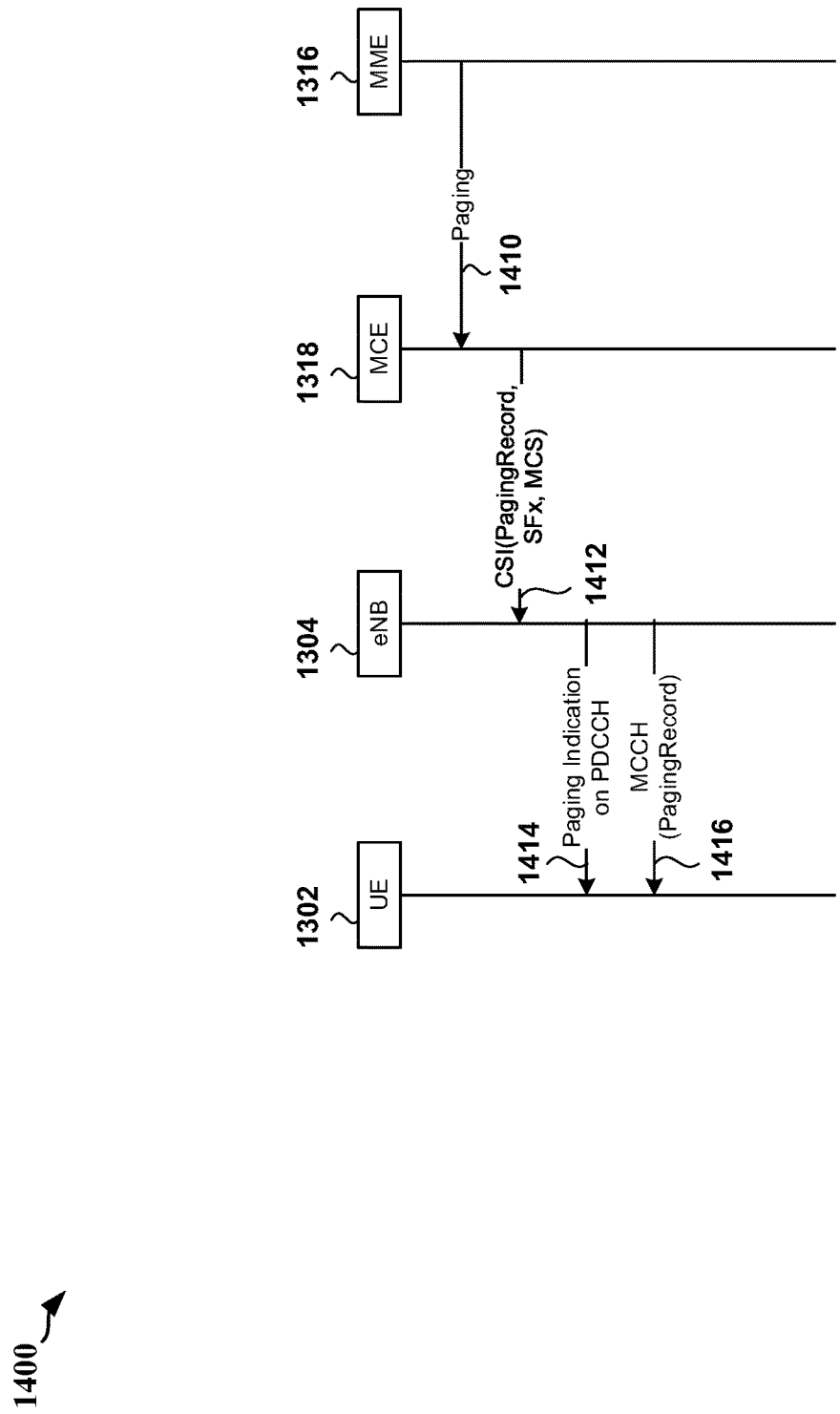
FIG. 14 is a signal flow diagram associated with the example network of FIG. 13.

As shown at 1410 in FIG. 14, in order to page the UE 1302, the MME 1316 sends a paging message to the MCE 1318. In an aspect, the MME 1316 may send the paging message to the MCE 1318 when MME 1316 knows that the registered area of the UE 1302 has MBMS (e.g., when the UE 1302 is within the MBSFN area 1320). The MCE 1318 may schedule an MBSFN transmission for the paging message. At 1412, the MCE 1318 may send a message including a CSI to the network access node 1304. In an aspect, the CSI may include a PagingRecord, a subframe identifier (e.g., SFx), and/or MCS. At 1414, the network access node 1304 sends a paging indication to the UE 1302. In an aspect, for power saving purposes, the network access node 1304 may use PDCCH on the paging occasion of the UE 1302 to provide the indication of the paging message to the UE 1302. At 1416, the UE 1302 receives the paging message from a multicast control channel (MCCH) using the paging indication. In an aspect, for network access nodes (e.g., network access nodes 1312 and 1314 in FIG. 13) outside of the MBSFN area 1320, the MME 1316 may send a separate paging message to the network access nodes. In an aspect, to reduce paging load, the MME 1316 may send pages to an MCE/network access node running on frequencies which the UE 1302 supports.

In an aspect, the network 1300 may provide system information and/or Earthquake and Tsunami Warning System (ETWS)/Public Warning System (PWS) information to the UE 1302 on MBMS. System Information can be separated into two sets: Semi-static System Information and Dynamic System Information. Semi-static system information can be transferred over MB SFN. For example, the MCE 1318 may perform version/change control for the semi-static system information. The MCE 1318 may schedule the system information transmission similar to a paging broadcast on MBSFN. The system information change can be notified by either PDCCH or MSI. ETWS/PWS information can be thought of as special system information and can be transmitted over MBSFN in a manner similar to system information.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method for a network access node for broadcasting content, comprising:
    receiving, at the network access node, one or more control plane signals from a broadcast multicast service center over a control plane signaling route that excludes a multimedia broadcast multicast services gateway and a mobility management entity, wherein the one or more control plane signals from the broadcast multicast service center includes a pre-cache start message containing at least a multicast Internet Protocol (IP) address associated with the content;
    caching the content to be broadcasted to one or more user equipment (UE) based on the one or more control plane signals, wherein the content is cached locally at the network access node, and wherein caching the content comprises:
        receiving, from a broadcast coordination entity, the multicast IP address,
        transmitting an IP multicast join message to the multimedia broadcast multicast services gateway, and receiving the content from the multimedia broadcast multicast services gateway through an IP multicast transmission using the multicast IP address; and
transmitting the cached content to the one or more UE.

2. The method of claim 1, further comprising:
receiving, from a broadcast coordination entity, scheduling information associated with the cached content, wherein the cached content is transmitted to the one or more UE based on the scheduling information.

3. The method of claim 2, wherein the scheduling information includes a content block identifier (ID), time information, and a modulation and coding scheme (MCS), and wherein the cached content is transmitted to the one or more UE in a broadcast transmission.

4. The method of claim 2, wherein the scheduling information includes a content block identifier (ID), and wherein the cached content is transmitted to the one or more UE in a multicast transmission.

5. The method of claim 1, further comprising:
switching, at the network access node, a bearer type used for transmitting the cached content to the one or more UE.

6. The method of claim 1, further comprising:
determining to cache the content, in the network access node based on the one or more control plane signals.

7. The method of claim 1, further comprising:
determining to cache the content in the network access node in response to receiving the pre-cache start, message.

8. A network access node, comprising:
a communication circuit configured to communicate with one or more network entities; and
a processing circuit coupled to the communication circuit, the processing circuit configured to:
receive, at the network access node, one or more control plane signals from a broadcast multicast service center over a control plane signaling route that excludes a multimedia broadcast multicast services gateway and a mobility management entity, wherein the one or more control plane signals from the broadcast multicast service center includes a pre-cache start message containing at least a multicast Internet Protocol (IP) address associated with content;
cache the content to be broadcasted to one or more user equipment (UE) based on the one or more control plane signals, wherein the content is cached locally at the network access node, and wherein caching the content comprises:
receiving, from a broadcast coordination entity, the multicast IP address,
transmitting an IP multicast join message to the multimedia broadcast multicast services gateway, and
receiving the content from the multimedia broadcast multicast services gateway through an IP multicast transmission using the multicast IP address; and
transmit the cached content to the one or more UE.

9. The network access node of claim 8, wherein the processing circuit is configured to:
receive, from a broadcast coordination entity, scheduling information associated with the cached content, wherein the cached content is transmitted to the one or more UE based on the scheduling information.

10. The network access node of claim 9, wherein the scheduling information includes a content block identifier (ID), time information, and a modulation and coding scheme (MCS), and wherein the cached content is transmitted to the one or more UE in a broadcast transmission.

11. A network access node, comprising:
means for receiving, at the network access node, one or more control plane signals from a broadcast multicast service center over a control plane signaling route that excludes a multimedia broadcast multicast services gateway and a mobility management entity, wherein the one or more control plane signals from the broadcast multicast service center includes a pre-cache start message containing at least a multicast Internet Protocol (IP) address associated with content;
means for caching the content to be broadcasted to one or more user equipment (UE) based on the one or more control plane signals, wherein the content is cached locally at the network access node, and wherein caching the content comprises:
receiving, from a broadcast coordination entity, the multicast IP address,
transmitting an IP multicast join message to the multimedia broadcast multicast services gateway, and
receiving the content from the multimedia broadcast multicast services gateway through an IP multicast transmission using the multicast IP address; and
means for transmitting the cached content to the one or more UE.

12. The network access node of claim 11, further comprising:
means for receiving, from a broadcast coordination entity, scheduling information associated with the cached content, wherein the cached content is transmitted to the one or more UE based on the scheduling information.

13. The network access node of claim 12, wherein the scheduling information includes a content block identifier (ID), time information, and a modulation and coding scheme (MCS), and wherein the cached content is transmitted to the one or more UE in a broadcast transmission.

14. A non-transitory processor-readable storage medium having one or more instructions operational in a network access node, which when executed by one or more processors causes the one or more processors to:
receive, at the network access node, one or more control plane signals from a broadcast multicast service center over a control plane signaling route that excludes a multimedia broadcast multicast services gateway and a mobility management entity, wherein the one or more control plane signals from the broadcast multicast service center includes a pre-cache start message containing at least a multicast Internet Protocol (IP) address associated with content;
cache the content to be broadcasted to one or more user equipment (UE) based on the one or more control plane signals, wherein the content is cached locally at the network access node, and wherein caching the content comprises:
receiving, from a broadcast coordination entity, the multicast IP address,
transmitting an IP multicast join message to the multimedia broadcast multicast services gateway, and
receiving the content from the multimedia broadcast multicast services gateway through an IP multicast transmission using the multicast IP address; and
transmit the cached content to the one or more UE.

15. The non-transitory processor-readable storage medium of claim 14, wherein the one or more instructions operational in the network access node further causes the one or more processors to:

receive, from a broadcast coordination entity, scheduling information associated with the cached content, wherein the cached content is transmitted to the one or more UE based on the scheduling information.

16. The non-transitory processor-readable storage medium of claim 15, wherein the scheduling information includes a content block identifier (ID), time information, and a modulation and coding scheme (MCS), and wherein the cached content is transmitted to the one or more UE in a broadcast transmission.

* * * * *